US012384910B2

(12) United States Patent
Tomoi

(10) Patent No.: US 12,384,910 B2
(45) Date of Patent: Aug. 12, 2025

(54) THERMOPLASTIC RESIN COMPOSITION FOR COOLING MEDIUM TRANSPORTATION PIPES, AND COOLING MEDIUM TRANSPORTATION PIPE

(71) Applicant: THE YOKOHAMA RUBBER CO., LTD., Tokyo (JP)

(72) Inventor: Shusaku Tomoi, Hiratsuka (JP)

(73) Assignee: THE YOKOHAMA RUBBER CO., LTD., Tokyo (JP)

(*) Notice: Subject to any disclaimer, the term of this patent is extended or adjusted under 35 U.S.C. 154(b) by 662 days.

(21) Appl. No.: 17/641,674

(22) PCT Filed: Aug. 24, 2020

(86) PCT No.: PCT/JP2020/031881
§ 371 (c)(1),
(2) Date: Mar. 9, 2022

(87) PCT Pub. No.: WO2021/054058
PCT Pub. Date: Mar. 25, 2021

(65) Prior Publication Data
US 2022/0325095 A1  Oct. 13, 2022

(30) Foreign Application Priority Data
Sep. 18, 2019 (JP) ................. 2019-169712

(51) Int. Cl.
C08L 53/02 (2006.01)
C08L 23/0846 (2025.01)
C08L 29/04 (2006.01)
C08L 67/03 (2006.01)
C08L 77/02 (2006.01)

(52) U.S. Cl.
CPC ........... C08L 53/02 (2013.01); C08L 23/0846 (2013.01); C08L 29/04 (2013.01); C08L 67/03 (2013.01); C08L 77/02 (2013.01); C08L 2203/18 (2013.01)

(58) Field of Classification Search
CPC ........ C08K 5/09; C08K 5/098; C08L 101/12; C08L 2203/18; C08L 23/0846; C08L 23/26; C08L 53/02; C08L 53/025; C08L 2205/03; C08L 2205/035; C08L 23/0861; C08L 23/22; C08L 25/08; F16L 11/04
See application file for complete search history.

(56) References Cited

U.S. PATENT DOCUMENTS

| | | | |
|---|---|---|---|
| 5,362,530 A | 11/1994 | Kitami et al. | |
| 6,602,283 B2 | 8/2003 | Doran et al. | |
| 2013/0156982 A1 | 6/2013 | Kawaguchi et al. | |
| 2013/0174933 A1 | 7/2013 | Yamakawa et al. | |
| 2015/0057414 A1* | 2/2015 | Tomoi | C08L 77/02 525/183 |
| 2016/0168370 A1 | 6/2016 | Sato | |

FOREIGN PATENT DOCUMENTS

| | | |
|---|---|---|
| JP | H4-145284 A | 5/1992 |
| JP | H9-314752 A | 12/1997 |
| JP | 2012-057127 A | 3/2012 |
| JP | 2015-030754 A | 2/2015 |
| JP | 2017105973 A | 6/2017 |
| JP | 2019-077742 A | 5/2019 |
| WO | WO 2012/039203 A1 | 3/2012 |

* cited by examiner

Primary Examiner — Ana L. Woodward
(74) Attorney, Agent, or Firm — POLSINELLI PC

(57) ABSTRACT

Provided is a thermoplastic resin composition for cooling medium transportation pipes, which has high barrier performance, is flexible and has good extrusion moldability. A thermoplastic resin composition which comprises a matrix that comprises a thermoplastic resin and a domain that comprises a rubber and is dispersed in the matrix, the thermoplastic resin composition being characterized by having an oxygen permeability coefficient ($cm^3 \cdot mm/(m^2 \cdot day \cdot mmHg)$) of 0.02 or less at 21° C. and at a humidity of 0%, and being also characterized in that the melt viscosity of the thermoplastic resin constituting the matrix is 300 Pa·s or less at 250° C. and at a shear rate of 243.2 $s^{-1}$, the thermoplastic resin comprises a thermoplastic resin having a melting point or a glass transition temperature of 150° C. or higher and a thermoplastic resin having an oxygen permeability coefficient of 0.004 or less or comprises a thermoplastic resin having a melting point or a glass transition temperature of 150° C. or higher and an oxygen permeability coefficient of 0.004 or less, and the rubber comprises an isobutylene-based block copolymer and an olefin- or styrene-based polymer having an epoxy group, an amino group, a hydroxyl group, an acid anhydride group or a carboxyl group.

20 Claims, No Drawings

THERMOPLASTIC RESIN COMPOSITION FOR COOLING MEDIUM TRANSPORTATION PIPES, AND COOLING MEDIUM TRANSPORTATION PIPE

CROSS REFERENCE TO RELATED APPLICATIONS

This application is a National Phase filing under 35 U.S.C. § 371 of PCT/JP2020/031881 filed on Aug. 24, 2020; which application in turn claims priority to Application No. 2019-169712 filed in Japan on Sep. 18, 2019. The entire contents of each application are hereby incorporated by reference.

FIELD

The present invention relates to a thermoplastic resin composition for a cooling medium transportation pipe, and a cooling medium transportation pipe. More specifically, the present invention relates to a thermoplastic resin composition for a cooling medium transportation pipe, comprising a matrix comprising a thermoplastic resin and a domain comprising a rubber dispersed in the matrix, as well as a cooling medium transportation pipe comprising a layer of the thermoplastic resin composition.

BACKGROUND

Automobiles are increasingly demanded to be reduced in weight, and there are efforts against realization of the reduction in weight by producing hoses made of resins high in barrier properties, instead of hoses made of rubber, which have been heretofore used for automobiles, to result in thinning. In particular, hoses for cooling medium transportation in air conditioners of current automobiles are mainly made of rubber materials, and, if such main raw materials can be replaced with resins high in barrier properties, the reduction in weight can be realized.

For example, Japanese Unexamined Patent Publication No. H4-145284 (Patent Literature 1) proposes, as a hose for transportation of a cooling medium such as Freon gas, a hose including an inner pipe, a reinforcement layer and an outer pipe, in which an inner layer of the inner pipe is formed from a polyamide-based resin, an outer layer of the inner pipe is formed from a polyamide/acrylic rubber graft polymer alloy or a thermoplastic elastomer including a thermoplastic polyolefin resin and EPDM, butyl-based rubber or acrylonitrile butadiene rubber, and the outer pipe is formed from a thermoplastic elastomer including a thermoplastic polyolefin resin and EPDM or butyl-based rubber.

CITATION LIST

Patent Literature

[Patent Literature 1] Japanese Unexamined Patent Publication No. H4-145284

SUMMARY

Technical Problem

The resin material of the inner layer of the inner pipe constituting the hose of Patent Literature 1, although is high in barrier properties, is lack in flexibility, and the resin material of the outer layer of the inner pipe and the resin material of the outer pipe constituting the hose, although are excellent in flexibility, are not necessarily satisfiable in extrusion processability.

An object of the present invention is to provide a thermoplastic resin composition for a cooling medium transportation pipe, the composition being high in barrier properties, flexible, and favorable in extrusion processability.

Solution to Problem

The present invention (I) provides a thermoplastic resin composition for a cooling medium transportation pipe, comprising a matrix comprising a thermoplastic resin and a domain comprising a rubber dispersed in the matrix, wherein the thermoplastic resin composition has an oxygen permeability coefficient of 0.02 cm$^3$·mm/(m day·mmHg) at a temperature of 21° C. and at a relative humidity of 0%, the thermoplastic resin constituting the matrix has a melt viscosity of not more than 300 Pa·s at a temperature of 250° C. and at a shear rate of 243.2 si, the thermoplastic resin comprises a thermoplastic resin having a melting point or glass transition point of not less than 150° C. and a thermoplastic resin having an oxygen permeability coefficient of not more than 0.004 cm$^3$·mm/(m$^2$·day·mmHg) at a temperature of 21° C. and at a relative humidity of 0%, or comprises a thermoplastic resin having a melting point or glass transition point of not less than 150° C. and having an oxygen permeability coefficient of not more than 0.004 cm$^3$·mm/(m$^2$·day·mmHg) at a temperature of 21° C. and at a relative humidity of 0%, and the rubber comprises an isobutylene-based block copolymer comprising a polyisobutylene block and a polystyrene block, and an olefin-based or styrene-based polymer having at least one functional group selected from the group consisting of an epoxy group, an amino group, a hydroxyl group, an acid anhydride group and a carboxyl group.

The present invention (II) provides a cooling medium transportation pipe comprising a layer of the thermoplastic resin composition of the present invention (I), as an inner layer.

The present invention includes the following aspects.

[1] A thermoplastic resin composition for a cooling medium transportation pipe, comprising a matrix comprising a thermoplastic resin and a domain comprising a rubber dispersed in the matrix, wherein the thermoplastic resin composition has an oxygen permeability coefficient of not more than 0.02 cm$^3$·mm/(m$^2$·day·mmHg) at a temperature of 21° C. and at a relative humidity of 0%, the thermoplastic resin constituting the matrix has a melt viscosity of not more than 300 Pa·s at a temperature of 250° C. and at a shear rate of 243.2 s$^{-1}$, the thermoplastic resin comprises a thermoplastic resin having a melting point or glass transition point of not less than 150° C. and a thermoplastic resin having an oxygen permeability coefficient of not more than 0.004 cm$^3$·mm/(m$^2$·day·mmHg) at a temperature of 21° C. and at a relative humidity of 0%, or comprises a thermoplastic resin having a melting point or glass transition point of not less than 150° C. and having an oxygen permeability coefficient of not more than 0.004 cm$^3$·mm (m$^2$·day·mmHg) at a temperature of 21° C. and at a relative humidity of 0%, and the rubber comprises an isobutylene-based block copolymer comprising a polyisobutylene block and a polystyrene block, and an olefin-based or styrene-based polymer having at least one functional group selected from the group consisting of an epoxy group, an amino group, a hydroxyl group, an acid anhydride group and a carboxyl group.

[2] The thermoplastic resin composition for a cooling medium transportation pipe according to [1], wherein the thermoplastic resin composition has a 10% modulus of not more than 10 MPa at a temperature of 25° C. and at a relative humidity of 50% in a tensile test according to JIS K7161.

[3] The thermoplastic resin composition for a cooling medium transportation pipe according to [1] or [2], wherein the thermoplastic resin is at least one selected from the group consisting of a polyamide, a polyester, an ethylene-vinyl alcohol copolymer, a polycarbonate and a polyketone.

[4] The thermoplastic resin composition for a cooling medium transportation pipe according to any one of [1] to [3], wherein the isobutylene-based block copolymer comprises a styrene-isobutylene diblock copolymer and/or a styrene-isobutylene-styrene triblock copolymer.

[5] The thermoplastic resin composition for a cooling medium transportation pipe according to any one of [1] to [4], wherein the olefin-based or styrene-based polymer having at least one functional group selected from the group consisting of an epoxy group, an amino group, a hydroxyl group, an acid anhydride group and a carboxyl group is at least one selected from the group consisting of an acid anhydride-modified α-olefin-based thermoplastic elastomer, an acid anhydride-modified styrene-ethylene-butylene-styrene block copolymer, an acid anhydride-modified styrene-ethylene-propylene-styrene block copolymer and an acid anhydride-modified ethylene-ethyl acrylate copolymer.

[6] The thermoplastic resin composition for a cooling medium transportation pipe according to any one of [1] to [5], wherein the thermoplastic resin composition comprises the matrix at a volume ratio of 25 to 50% by volume and the domain at a volume ratio of 50 to 75% by volume.

[7] The thermoplastic resin composition for a cooling medium transportation pipe according to any one of [1] to [6], wherein the proportion of the total amount of the thermoplastic resin having a melting point or glass transition point of not less than 150° C., the thermoplastic resin having an oxygen permeability coefficient of not more than 0.004 $cm^3 \cdot mm/(m^2 \cdot day \cdot mmHg)$ at a temperature of 21° C. and at a relative humidity of 0%, and the thermoplastic resin having a melting point or glass transition point of not less than 150° C. and having an oxygen permeability coefficient of not more than 0.004 $cm^3 \cdot mm/(m^2 \cdot day \cdot mmHg)$ at a temperature of 21° C. and at a relative humidity of 0% in the matrix is not less than 50% by weight.

[8] The thermoplastic resin composition for a cooling medium transportation pipe according to any one of [1] to [7], wherein the proportion of the isobutylene-based block copolymer in the domain is 50 to 95% by weight.

[9] The thermoplastic resin composition for a cooling medium transportation pipe according to any one of [1] to [8], wherein the thermoplastic resin composition comprises 0.5 to 5 parts by weight of at least one selected from the group consisting of a fatty acid, a fatty acid metal salt, a fatty acid ester and a fatty acid amide based on 100 parts by weight of the rubber in the thermoplastic resin composition.

[10] The thermoplastic resin composition for a cooling medium transportation pipe according to any one of [1] to [9], wherein the thermoplastic resin composition comprises 0.5 to 10 parts by weight of a divalent metal oxide based on 100 parts by weight of the rubber in the thermoplastic resin composition.

[11] The thermoplastic resin composition for a cooling medium transportation pipe according to any one of [1] to [10], wherein the thermoplastic resin composition comprises 0.1 to 8 parts by weight of a trihydric alcohol having a triazine backbone based on 100 parts by weight of the rubber in the thermoplastic resin composition.

[12] A cooling medium transportation pipe comprising a layer of the thermoplastic resin composition according to any one of [1] to [11], as an inner layer.

Advantageous Effects of Invention

The thermoplastic resin composition for a cooling medium transportation pipe of the present invention is high in barrier properties, flexible, and favorable in extrusion processability.

DESCRIPTION OF EMBODIMENTS

The present invention (I) provides a thermoplastic resin composition for a cooling medium transportation pipe, comprising a matrix comprising a thermoplastic resin and a domain comprising a rubber dispersed in the matrix, in which the thermoplastic resin composition has an oxygen permeability coefficient of not more than 0.02 $cm^3 \cdot mm/(m^2 \cdot day \cdot mmHg)$ at a temperature of 21° C. and at a relative humidity of 0%, the thermoplastic resin constituting the matrix has a melt viscosity of not more than 300 Pa·s at a temperature of 250° C. and at a shear rate of 243.2 $s^{-1}$, the thermoplastic resin comprises a thermoplastic resin having a melting point or glass transition point of not less than 150° C. and a thermoplastic resin having an oxygen permeability coefficient of not more than 0.004 $cm^3 \cdot mm/(m^2 \cdot day \cdot mmHg)$ at a temperature of 21° C. and at a relative humidity of 0%, or comprises a thermoplastic resin having a melting point or glass transition point of not less than 150° C. and having an oxygen permeability coefficient of not more than 0.004 $cm^3 \cdot mm/(m^2 \ day \cdot mmHg)$ at a temperature of 21° C. and at a relative humidity of 0%, and the rubber comprises an isobutylene-based block copolymer comprising a polyisobutylene block and a polystyrene block, and an olefin-based or styrene-based polymer having at least one functional group selected from the group consisting of an epoxy group, an amino group, a hydroxyl group, an acid anhydride group and a carboxyl group.

The present invention (1) relates to a thermoplastic resin composition for a cooling medium transportation pipe. The cooling medium transportation pipe refers to a pipe for transportation of a cooling medium in an air conditioner or the like. The pipe may be a hose having flexibility or a pipe which is hard and not to be easily deformed. The thermoplastic resin composition of the present invention can be suitably used in particular for producing a hose for transportation of a cooling medium in an air conditioner of an automobile. The cooling medium transportation pipe usually comprises an inner pipe, a reinforcement layer and an outer pipe, and the thermoplastic resin composition of the present invention can be suitably used in particular for producing the inner pipe of the cooling medium transportation pipe. Examples of the cooling medium in an air conditioner can include hydrofluorocarbon (HFC), hydrofluoroolefin (HFO), hydrocarbon, carbon dioxide and ammonia; examples of the HFC include R410A, R32, R404A, R407C, R507A and R134a; examples of the HFO include R1234yf, R1234ze, 1233zd, R1123, R1224yd and R1336mzz; and examples of the hydrocarbon include methane, ethane, propane, propylene, butane, isobutane, hexafluoropropane and pentane.

The thermoplastic resin composition of the present invention comprises a matrix and a domain dispersed in the matrix. In other words, the thermoplastic resin composition of the present invention has a so-called sea-island structure.

The matrix corresponds to a sea, and the domain corresponds to an island. The ratio between the matrix and the domain is not limited as long as the effects of the present invention are exerted, and preferably the volume ratio of the matrix and the volume ratio of the domain in the thermoplastic resin composition are respectively 25 to 50% by volume and 50 to 75% by volume. The volume ratio of the matrix in the thermoplastic resin composition is more preferably 25 to 40% by volume, still more preferably 30 to 40% by volume. If the volume ratio of the matrix is too low, phase inversion between the matrix and the domain may occur to result in reverse in the sea-island structure. If the volume ratio of the matrix is too high, the content of the thermoplastic resin constituting the matrix may be increased to thereby cause no desired flexibility to be obtained.

The matrix comprises a thermoplastic resin. The thermoplastic resin comprises a thermoplastic resin having a melting point or glass transition point of not less than 150° C. and a thermoplastic resin having an oxygen permeability coefficient of not more than 0.004 $cm^3 \cdot mm/(m^2 \cdot day \cdot mmHg)$ at a temperature of 21° C. and at a relative humidity of 0%, or comprises a thermoplastic resin having a melting point or glass transition point of not less than 150° C. and having an oxygen permeability coefficient of not more than 0.004 $cm^3 \cdot mm/(m^2 \cdot day \cdot mmHg)$ at a temperature of 21° C. and at a relative humidity of 0%.

When the thermoplastic resin composition of the present invention is used for a pipe for transportation of a cooling medium in an air conditioner of an automobile, such a cooling medium transportation pipe produced using the thermoplastic resin composition of the present invention is placed in an engine compartment of such an automobile, and the engine compartment has a portion whose temperature reaches around 150° C. and thus the matrix preferably comprises a thermoplastic resin having a melting point or glass transition point of not less than 150° C. The thermoplastic resin preferably has a melting point or glass transition point of 150 to 300° C., more preferably has a melting point or glass transition point of 170 to 270° C. If the melting point or glass transition point of the thermoplastic resin is too high, the thermoplastic resin composition is deteriorated in molding processability.

Examples of the thermoplastic resin having a melting point or glass transition point of not less than 150° C. (hereinafter, also referred to as "high-melting point resin") can include, but are not limited to, a polyamide, a polyester, an ethylene-vinyl alcohol copolymer, a polycarbonate, a polyketone, a polyvinyl alcohol, a polyvinyl chloride, a polyvinylidene chloride, a polyphenylene sulfide, a polysulfone, a polyacetal, a polyphenylene ether, a polyether ether ketone, a polyimide, and a polymethylpentene.

Exampled of the thermoplastic resin having an oxygen permeability coefficient of not more than 0.004 $cm^3 \cdot mm/(m^2 \cdot day \cdot mmHg)$ at a temperature of 21° C. and at a relative humidity of 0% (hereinafter, also referred to as "low oxygen permeable resin") can include a polyamide, a polyester, an ethylene-vinyl alcohol copolymer, a polycarbonate, a polyketone, a polyvinyl alcohol, a polyvinyl chloride, a polyvinylidene chloride and a polyimide.

The "oxygen permeability coefficient at a temperature of 21° C. and at a relative humidity of 0%" is hereinafter also simply referred to as "oxygen permeability coefficient".

Inclusion of the low oxygen permeable resin in the matrix can make the thermoplastic resin composition of the present invention to have a desired oxygen permeability coefficient.

Examples of the thermoplastic resin having a melting point or glass transition point of not less than 150° C. and having an oxygen permeability coefficient of not more than 0.004 $cm^3 \cdot mm/(m^2 \cdot day \cdot mmHg)$ at a temperature of 21° C. and at a relative humidity of 0% (hereinafter, also referred to as "high melting point/low oxygen permeable resin") can include a polyamide, a polyester, an ethylene-vinyl alcohol copolymer, a polycarbonate and a polyketone.

Inclusion of the high melting point/low oxygen permeable resin in the matrix can make the thermoplastic resin composition of the present invention to have desired heat resistance and oxygen permeability coefficient.

Examples of the polyamide include nylon 6 having a melting point of 225° C. and an oxygen permeability coefficient of 0.001 $cm^3 \cdot mm/(m^2 \cdot day \cdot mmHg)$, a nylon 666 copolymer having a melting point of 195° C. and an oxygen permeability coefficient of 0.003 $cm^3 \cdot mm/(m^2 \cdot day \cdot mmHg)$, a nylon 612 copolymer having a melting point of 201° C. and an oxygen permeability coefficient of 0.003 $cm^3 \cdot mm/(m^2 \cdot day \cdot mmHg)$, nylon 66 having a melting point of 265° C., nylon 11 having a melting point of 187° C. nylon 12 having a melting point of 176° C., nylon 610 having a melting point of 225° C., nylon 46 having a melting point of 295° C. nylon 6T having a melting point of 320° C., nylon 9T having a melting point of 300° C. and nylon MXD6 having a melting point of 243° C. Nylon 6, a nylon 612 copolymer and a nylon 666 copolymer are preferable.

Examples of the polyester include polyethylene terephthalate having a melting point of 256° C., polybutylene terephthalate having a melting point of 225° C. and an oxygen permeability coefficient of 0.003 $cm^3 \cdot mm/(m^2 \cdot day \cdot mmHg)$, polyethylene naphthalate having a melting point of 265° C. and polybutylene naphthalate having a melting point of 243° C. Polybutylene terephthalate is preferable.

The ethylene-vinyl alcohol copolymer is varied in melting point and oxygen permeability coefficient depending on the copolymerization proportions of ethylene and vinyl alcohol. A preferable copolymerization proportion of ethylene is 25 to 48% by mol. In particular, an ethylene-vinyl alcohol copolymer in which the copolymerization proportion of ethylene is 48% by mol, which has a melting point of 158° C. and an oxygen permeability coefficient of 0.00003 $cm^3 \cdot mm/(m^2 \cdot day \cdot mmHg)$, is preferable.

Examples of the polycarbonate include bisphenol A type polycarbonate having a glass transition point of 150° C.

Examples of the polyketone include a ketone-ethylene copolymer having a melting point of 255° C. and a ketone-ethylene-propylene terpolymer having a melting point of 220° C.

The matrix may comprise any resin other than the high-melting point resin, the low oxygen permeable resin and the high melting point/low oxygen permeable resin, and various additives, as long as the effects of the present invention are not impaired.

Herein, the proportion of the total amount of the high-melting point resin, the low oxygen permeable resin and the high melting point/low oxygen permeable resin in the matrix is preferably not less than 50% by weight, more preferably not less than 60% by weight, still more preferably not less than 70% by weight. In a case where the proportion in the matrix is in this numerical value range, the thermoplastic resin composition of the present invention can have desired heat resistance and oxygen permeability coefficient.

The domain comprises a rubber. The rubber comprises an isobutylene-based block copolymer comprising a polyisobutylene block and a polystyrene block, and an olefin-based or styrene-based polymer having at least one functional group selected from the group consisting of an epoxy group, an amino group, a hydroxyl group, an acid anhydride group and a carboxyl group.

Examples of the isobutylene-based block copolymer comprising a polyisobutylene block and a polystyrene block (hereinafter, also simply referred to as "isobutylene-based block copolymer") include a styrene-isobutylene diblock copolymer, a styrene-isobutylene-styrene triblock copolymer, and a modified product thereof. A styrene-isobutylene diblock copolymer and a styrene-isobutylene-styrene triblock copolymer are preferable.

Inclusion of the isobutylene-based block copolymer in the rubber can make the thermoplastic resin composition of the present invention to have a desired oxygen permeability coefficient.

Examples of the olefin-based or styrene-based polymer having at least one functional group selected from the group consisting of an epoxy group, an amino group, a hydroxyl group, an acid anhydride group and a carboxyl group (hereinafter, also referred to as "olefin-based or styrene-based polymer having a specified functional group") include an $\alpha$-olefin-based thermoplastic elastomer, a styrene-ethylene-butylene-styrene block copolymer, a styrene-ethylene-propylene-styrene block copolymer, an acid anhydride-modified ethylene-ethyl acrylate copolymer, a styrene-butadiene-styrene block copolymer and a styrene-isoprene-styrene block copolymer each having an epoxy group, an amino group, a hydroxyl group, an acid anhydride group or a carboxyl group. At least one selected from the group consisting of an acid anhydride-modified $\alpha$-olefin-based thermoplastic elastomer, an acid anhydride-modified styrene-ethylene-butylene-styrene block copolymer, an acid anhydride-modified styrene-ethylene-propylene-styrene block copolymer and an acid anhydride-modified ethylene-ethyl acrylate copolymer is preferable.

When the rubber comprises the olefin-based or styrene-based polymer having a specified functional group, it serves as a compatibilizing agent between the isobutylene-based block copolymer and the matrix resin to thereby contribute to stabilization of the sea-island structure.

The proportion of the isobutylene-based block copolymer in the domain is preferably 50 to 95% by weight, more preferably 60 to 95% by weight, still more preferably 70 to 95% by weight. If the proportion of the isobutylene-based block copolymer is too low, the thermoplastic resin composition may be deteriorated in barrier properties. If the proportion of the isobutylene-based block copolymer is too high, the sea-island structure of the thermoplastic resin composition may be broken to result in deteriorations in barrier properties and processability.

The proportion of the olefin-based or styrene-based polymer having a specified functional group in the domain is preferably 5 to 50% by weight, more preferably 5 to 40% by weight, still more preferably 5 to 30% by weight. If the proportion of the olefin-based or styrene-based polymer having a specified functional group is too low, the sea-island structure of the thermoplastic resin composition may be broken to result in deteriorations in barrier properties and processability. If the proportion of the olefin-based or styrene-based polymer having a specified functional group is too high, the thermoplastic resin composition may be deteriorated in barrier properties.

The domain may comprise any rubber other than the isobutylene-based block copolymer and the olefin-based or styrene-based polymer having a specified functional group, and various additives, as long as the effects of the present invention are not impaired.

The thermoplastic resin composition preferably comprises at least one selected from the group consisting of a fatty acid, a fatty acid metal salt, a fatty acid ester and a fatty acid amide. Inclusion of at least one selected from the group consisting of a fatty acid, a fatty acid metal salt, a fatty acid ester and a fatty acid amide can make the thermoplastic resin composition to be further enhanced in extrusion processability.

Examples of the fatty acid include stearic acid, palmitic acid and oleic acid. Stearic acid is preferable.

Examples of the fatty acid metal salt include calcium stearate, magnesium stearate, zinc stearate and barium stearate. In particular, calcium stearate is preferable.

Examples of the fatty acid ester include a fatty acid ester obtained by an esterification reaction of a higher fatty acid obtained by hydrolyzing coconut oil, castor oil, palm oil, beef tallow or the like with a lower alcohol, a higher alcohol or a polyhydric alcohol.

Examples of the fatty acid amide include stearylamide, palmitylamine and oleylamide.

The content of at least one selected from the group consisting of a fatty acid, a fatty acid metal salt, a fatty acid ester and a fatty acid amide is preferably 0.5 to 5 parts by weight, more preferably 1 to 4 parts by weight, still more preferably 1 to 3 parts by weight based on 100 parts by weight of the rubber in the thermoplastic resin composition. If the content is too high, the thermoplastic resin composition may be deteriorated in barrier properties.

At least one selected from the group consisting of a fatty acid, a fatty acid metal salt, a fatty acid ester and a fatty acid amide may be present in either the matrix or the domain, or may be present in both the matrix and the domain.

The thermoplastic resin composition preferably comprises a divalent metal oxide. Inclusion of a divalent metal oxide can make the thermoplastic resin composition to be more enhanced in extrusion processability.

Examples of the divalent metal oxide include zinc oxide, magnesium oxide, copper oxide, calcium oxide and iron oxide. Zinc oxide or magnesium oxide is preferable, and zinc oxide is more preferable.

The content of the divalent metal oxide is preferably 0.5 to 10 parts by weight, more preferably 1 to 10 parts by weight, still more preferably 3 to 8 parts by weight based on 100 parts by weight of the rubber in the thermoplastic resin composition. If the content is too high, the thermoplastic resin composition may be deteriorated in fatigue durability.

The divalent metal oxide may be present in either the matrix or the domain, or may be present in both the matrix and the domain.

The thermoplastic resin composition preferably comprises a trihydric alcohol having a triazine ring. Inclusion of the trihydric alcohol having a triazine ring can make the thermoplastic resin composition to be enhanced in fatigue durability.

The trihydric alcohol having a triazine ring is preferably, but not limited to, tris(2-hydroxyethyl)isocyanurate.

The content of the trihydric alcohol having a triazine ring is preferably 0.1 to 8 parts by weight, more preferably 0.5 to 6 parts by weight, still more preferably 1 to 5 parts by weight based on 100 parts by weight of the rubber in the thermoplastic resin composition. If the content of the trihydric alcohol having a triazine ring is too high, the thermoplastic resin composition may be deteriorated in extrusion processability.

The trihydric alcohol having a triazine ring may be present in either the matrix or the domain, or may be present in both the matrix and the domain.

The thermoplastic resin constituting the matrix preferably has a melt viscosity of not more than 300 Pa·s at a temperature of 250° C. and at a shear rate of 243.2 s$^{-1}$ (hereinafter, also simply referred to as "melt viscosity"), preferably 50 to 300 Pa·s, more preferably 50 to 150 Pa·s. If the melt viscosity of the thermoplastic resin constituting the matrix is too high, phase inversion between the matrix and the domain may easily occur not to enable the volume fraction of the rubber in the domain to be increased. If the melt viscosity of the thermoplastic resin constituting the matrix is too low, rubber particles may be hardly finely dispersed in the domain to result in deterioration in fatigue durability.

The melt viscosity of the thermoplastic resin constituting the matrix can be adjusted by the molecular weight of the thermoplastic resin.

The melt viscosity of the thermoplastic resin constituting the matrix can be measured with a capillary rheometer.

In a case where a plurality of such thermoplastic resins constituting the matrix are present, the melt viscosity measured with respect to a sample obtained by mixing such thermoplastic resins at a compounding ratio thereof is defined as the melt viscosity of such thermoplastic resins constituting the matrix.

The thermoplastic resin composition preferably has an oxygen permeability coefficient of not more than 0.02 cm$^3$·mm/(m$^2$·day·mmHg), more preferably 0.015 cm$^3$·mm/(m$^2$·day·mmHg) or less, further preferably not more than 0.01 cm$^3$·mm/(m$^2$·day·mmHg), at a temperature of 21° C. and at a relative humidity of 0%. When the oxygen permeability coefficient of the thermoplastic resin composition is in this numerical value range, the thermoplastic resin composition is enhanced also in barrier properties to a cooling medium and thus can be suitably utilized as a thermoplastic resin composition for a cooling medium transportation pipe.

The oxygen permeability coefficient of the thermoplastic resin composition can be adjusted by the respective types and proportions of the thermoplastic resin constituting the matrix and the rubber constituting the domain.

The thermoplastic resin composition preferably has a 100% modulus of not more than 10 MPa, more preferably not more than 8 MPa, still more preferably not more than 6 MPa at a temperature of 25° C. and at a relative humidity of 50% in a tensile test according to JIS K7161. When the 10% modulus of the thermoplastic resin composition is in this numerical value range, the thermoplastic resin composition is excellent in flexibility and thus can be suitably utilized as a thermoplastic resin composition for a cooling medium transportation pipe.

The 10% modulus of the thermoplastic resin composition can be adjusted by the respective types and proportions of the thermoplastic resin constituting the matrix and the rubber constituting the domain.

The thermoplastic resin composition, although is not particularly limited with respect to the production method therefor, can be produced by kneading the thermoplastic resin and the rubber, and, if necessary, at least one selected from the group consisting of a fatty acid, a fatty acid metal salt, a fatty acid ester and a fatty acid amide, the divalent metal oxide, the trihydric alcohol having a triazine ring, and other additive(s) by a twin screw kneading extruder or the like.

The present invention (II) provides a cooling medium transportation pipe comprising a layer of the thermoplastic resin composition of the present invention (1), as an inner layer.

The cooling medium transportation pipe of the present invention is preferably used in a hose for transportation of a cooling medium in an air conditioner, more preferably in a hose for transportation of a cooling medium in an air conditioner of an automobile.

The cooling medium transportation pipe preferably comprises an inner pipe, a reinforcement layer and an outer pipe. At least one layer of the inner pipe in the cooling medium transportation pipe of the present invention comprises the thermoplastic resin composition.

The cooling medium transportation pipe, although is not particularly limited with respect to the production method therefor, can be produced as follows. The pipe can be produced by first extruding an inner pipe in the form of a tube, thereafter braiding, on the tube, a fiber serving as a reinforcement layer, and furthermore covering the fiber with an outer pipe by extrusion.

EXAMPLES (1) Raw Materials

Raw materials used in the following Examples and Comparative Examples are as follows.

Nylon-1: nylon 6, "UBE NYLON®" 1011FB manufactured by UBE INDUSTRIES, LTD., and having a melting point of 225° C., an oxygen permeability coefficient of 0.001 cm$^3$·mm/(m$^2$ day·mmHg), and a melt viscosity of 90 Pa·s Nylon-2: nylon 612 copolymer, "UBE NYLON®" 7024B manufactured by UBE INDUSTRIES, LTD., and having a melting point of 201° C., an oxygen permeability coefficient of 0.003 cm$^3$·mm/(m$^2$·day·mmHg), and a melt viscosity of 270 Pa·s Nylon-3: nylon 666 copolymer, "NOVAMID®" 2010R manufactured by DSM, and having a melting point of 200° C., an oxygen permeability coefficient of 0.003 cm$^3$·mm/(m$^2$·day·mmHg), and a melt viscosity of 107 Pa·s Nylon-4: nylon 6, "UBE NYLON." 1022B manufactured by UBE INDUSTRIES, LTD., and having a melting point of 225° C., an oxygen permeability coefficient of 0.001 cm$^3$·mm/(m$^2$·day·mmHg), and a melt viscosity of 600 Pa·s EVOH: ethylene-vinyl alcohol copolymer having an amount of ethylene of 48% by mol, "SoarnoL™" H481513 manufactured by NIHON GOSEI KAKO Co., Ltd., and having a melting point of 158° C., an oxygen permeability coefficient of 0.00003 cm$^3$·mm/(m$^2$·day·mmHg), and a melt viscosity of 259 Pa·s Polyester: polybutylene terephthalate, "NOVADURAN®"5010R5 manufactured by Mitsubishi Engineering-Plastics Corporation, and having a melting point of 224° C., an oxygen permeability coefficient of 0.003 cm$^3$·mm/(m$^2$·day·mmHg), and a melt viscosity of 300 Pa·s SIBS: styrene-isobutylene-styrene block copolymer, "SIBSTAR®" 102T manufactured by KANEKA CORPORATION, which is non-crystalline and has an oxygen permeability coefficient of 0.076 cm$^3$·mm/(m$^2$·day·mmHg)

Acid-modified styrene-based elastomer-1: maleic anhydride-modified styrene-ethylene-butylene-styrene block copolymer, "TUFTEC®" M1913 manufactured by Asahi Kasei Corporation, which is non-crystalline and has an oxygen permeability coefficient of 1.113 cm$^3$·mm/(m$^2$ day·mmHg)

Acid-modified styrene-based elastomer-2: maleic anhydride-modified styrene-ethylene-butylene-styrene block copolymer, "TUFTEC®" M1943 manufactured by Asahi Kasei Corporation, which is non-crystalline and has an oxygen permeability coefficient of 1.355 cm³·mm/(m²·day·mmHg)

Acid-modified polyolefin-1: maleic anhydride-modified α-olefin copolymer, "TAFMER®" MH7020 manufactured by Mitsui Chemicals, Inc., which is non-crystalline and has an oxygen permeability coefficient of 1.554 cm³·mm/(m²·day·mmHg)

Acid-modified polyolefin-2: maleic anhydride-modified α-olefin copolymer, "TAFMER®" MP0620 manufactured by Mitsui Chemicals, Inc., which is non-crystalline and has an oxygen permeability coefficient of 1.436 cm³·mm/(m²·day·mmHg)

Zinc oxide: Zinc Oxide III manufactured by SEIDO CHEMICAL INDUSTRY CO., LTD.

Stearic acid: industrial stearic acid manufactured by Chiba Fatty Acid Co., Ltd.

Calcium stearate: calcium stearate SC-PG manufactured by SAKAI CHEMICAL INDUSTRY CO., LTD.

Trihydric alcohol having a triazine ring: tris(2-hydroxyethyl)isocyanurate, "THEIC" manufactured by SHIKOKU CHEMICALS CORPORATION (2) Preparation of Thermoplastic Resin Composition Each thermoplastic resin composition shown in Tables 1 to 3 was prepared by the following method. First, a thermoplastic resin and zinc oxide were mixed so that the content of the zinc oxide was 50% by weight, and thus a zinc oxide master batch was produced. When a plurality of thermoplastic resins were used and compounded, such a master batch was produced by a thermoplastic resin larger in amount of compounding. Next, each raw material was loaded into a twin screw kneading extruder (manufactured by THE JAPAN STEEL WORKS, LTD.) at a compounding ratio shown in Tables 1 to 3, and kneaded at 235° C. for 3 minutes. The kneaded product was continuously extruded in the form of a strand from the extruder, cooled with water, and then cut by a cutter, and thus a pellet-shaped thermoplastic resin composition was obtained. The zinc oxide was added so as to be in a desired amount compounded in the master batch.

(3) Evaluation of Thermoplastic Resin Composition

The melt viscosity of the thermoplastic resin constituting the matrix, and the oxygen permeability coefficient, the 10% modulus, the extrusion processability and the dynamic fatigue durability of the thermoplastic resin composition prepared were evaluated. The evaluation results are shown in Tables 1 to 3.

The respective methods for measuring the melt viscosity, the oxygen permeability coefficient, the 10% modulus, the extrusion processability and the dynamic fatigue durability are as described below.

[Measurement of Melt Viscosity of Thermoplastic Resin Constituting Matrix]

The melt viscosity (in units of Pa·s) of the thermoplastic resin constituting the matrix was measured with a capillary rheometer "CAPILOGRAPH 1C" manufactured by Toyo Seiki Seisaku-sho, Ltd., and an orifice having a diameter of 1 mm and a length of 10 mm at a shear rate of 243 s⁻¹ and at a temperature of 250° C. for a retention time of 5 minutes.

[Measurement of Oxygen Permeability Coefficient]

The oxygen permeability coefficient was measured at a temperature of 21° C. and at a relative humidity of 0% with OX-TRAN 1/50 manufactured by MOCON, Inc., with respect to a sheet obtained by extruding a sample in the form of a sheet having a thickness of 0.2 mm at 235° C. by use of a T-die extrusion apparatus having a die width of 550 mm and a φ40 mm single screw extruder and manufactured by Pla Giken Co., Ltd.

[Measurement of 10% Modulus]

The 10% modulus was determined by extruding a sample in the form of a sheet having a thickness of 1 mm at 235° C. by use of a T-die extrusion apparatus having a die width of 200 mm and φ40 mm single screw extruder and manufactured by Pla Giken Co., Ltd., punching a JIS 3 dumbbell so that the sheet extrusion direction in the resulting sheet was a longitudinal direction, and performing a tensile test at a temperature of 25° C. and at a relative humidity of 50% according to JIS K7161 by use of a tensile tester AUTOGRAPH® manufactured by Shimadzu Corporation.

[Evaluation of Extrusion Processability]

A sheet having a thickness of 1 mm was obtained by extruding a sample at 235° C. by use of a T-die extrusion apparatus having a die width of 200 mm and a φ40 mm single screw extruder and manufactured by Pla Giken Co., Ltd., and was rated as "Good" when could be formed without any problems, "Acceptable" when resulted in slight grains, hole formation, breaking of a sheet end and/or like, and "Not acceptable" when resulted in serious grains, hole formation, breaking of a sheet end and/or like.

[Measurement of Dynamic Fatigue Durability]

Six JIS 3 dumbbells were punched from the sheet obtained in the "Evaluation of Extrusion Processability" so that the sheet extrusion direction was a longitudinal direction, and were each repeatedly subjected to a strain of 40% (constant strain fatigue test) at −35° C. by a constant strain testing machine manufactured by UESHIMA SEISAKUSHO CO., LTD. The test was performed until all the dumbbells were fractured, and the endurance count at a fracture rate of 63.2% according to a Weibull plot was defined as the dynamic fatigue durability. The value in Example 1 was assumed to be 100, and the endurance counts in other Examples and Comparative Examples were each relatively compared therewith.

TABLE 1

|  |  | Example 1 | Example 2 | Example 3 | Example 4 | Example 5 | Example 6 |
|---|---|---|---|---|---|---|---|
| Nylon-1 | part(s) by weight | 62.2 | 38.8 | 63.0 | 53.3 | 43.4 |  |
| Nylon-2 | part(s) by weight |  |  |  | 8.7 | 17.3 |  |
| Nylon-3 | part(s) by weight |  |  |  |  |  | 49.1 |
| Nylon-4 | part(s) by weight |  |  |  |  |  |  |
| EVOH | part(s) by weight |  |  |  |  |  |  |
| Polyester | part(s) by weight |  |  |  |  |  |  |
| SIBS | part(s) by weight | 80.0 | 80.0 | 30.0 | 50.0 | 95.0 | 80.0 |
| Acid-modified styrene-based elastomer-1 | part(s) by weight | 20.0 | 20.0 | 70.0 | 50.0 | 5.0 |  |
| Acid-modified styrene-based elastomer-2 | part(s) by weight |  |  |  |  |  | 20.0 |
| Acid-modified polyolefin-1 | part(s) by weight |  |  |  |  |  |  |
| Acid-modified polyolefin-2 | part(s) by weight |  |  |  |  |  |  |

TABLE 1-continued

|  |  | Example 1 | Example 2 | Example 3 | Example 4 | Example 5 | Example 6 |
|---|---|---|---|---|---|---|---|
| Zinc oxide | part(s) by weight | 5.0 | 3.0 | 5.0 | 5.0 | 5.0 | 5.0 |
| Stearic acid | part(s) by weight | 1.0 | 0.5 | 1.0 | 1.0 | 1.0 | 1.0 |
| Calcium stearate | part(s) by weight | 1.0 | 0.5 | 1.0 | 1.0 | 1.0 | 1.0 |
| Trihydric alcohol having triazine backbone | part(s) by weight |  |  |  |  |  |  |
| Total | part(s) by weight | 169.2 | 142.8 | 170.0 | 169.0 | 167.7 | 156.1 |
| Melt viscosity of thermoplastic resin constituting matrix | Pa·s | 90 | 90 | 90 | 93 | 96 | 107 |
| Volume ratio of domain | % by volume | 65 | 75 | 65 | 65 | 65 | 70 |
| Proportion of SIBS in domain | % by weight | 80 | 80 | 30 | 50 | 95 | 80 |
| Oxygen permeability coefficient of thermoplastic resin composition | cm$^3$·mm/(m$^2$·day·mmHg) | 0.0081 | 0.0108 | 0.0200 | 0.0117 | 0.0093 | 0.0090 |
| 10% Modulus of thermoplastic resin composition | MPa | 5.0 | 3.9 | 5.4 | 5.3 | 4.8 | 4.3 |
| Extrusion processability of thermoplastic resin composition |  | Good | Acceptable | Good | Good | Good | Good |
| Dynamic fatigue durability of thermoplastic resin composition |  | 100 | 140 | 90 | 100 | 110 | 150 |

TABLE 2

|  |  | Example 7 | Example 8 | Example 9 | Example 10 | Example 11 | Example 12 |
|---|---|---|---|---|---|---|---|
| Nylon-1 | part(s) by weight |  |  | 81.7 | 77.2 | 78.3 | 79.7 |
| Nylon-2 | part(s) by weight |  |  |  |  |  |  |
| Nylon-3 | part(s) by weight |  |  |  |  |  |  |
| Nylon-4 | part(s) by weight |  |  |  |  |  |  |
| EVOH | part(s) by weight | 75.7 |  |  |  |  |  |
| Polyester | part(s) by weight |  | 136.3 |  |  |  |  |
| SIBS | part(s) by weight | 65.0 | 70.0 | 60.0 | 60.0 | 60.0 | 60.0 |
| Acid-modified styrene-based elastomer-1 | part(s) by weight | 35.0 | 30.0 |  |  |  |  |
| Acid-modified styrene-based elastomer-2 | part(s) by weight |  |  |  |  |  |  |
| Acid-modified polyolefin-1 | part(s) by weight |  |  | 40.0 | 40.0 |  |  |
| Acid-modified polyolefin-2 | part(s) by weight |  |  |  |  | 40.0 | 40.0 |
| Zinc oxide | part(s) by weight | 5.0 | 5.0 | 5.0 | 3.0 | 0.5 | 10.0 |
| Stearic acid | part(s) by weight | 1.0 | 1.0 | 0.2 | 1.0 | 1.5 | 0.5 |
| Calcium stearate | part(s) by weight | 2.0 | 1.0 | 0.3 | 4.0 | 3.0 | 1.0 |
| Trihydric alcohol having triazine backbone | part(s) by weight |  |  |  |  |  |  |
| Total | part(s) by weight | 183.7 | 243.3 | 187.2 | 185.2 | 183.3 | 191.2 |
| Melt viscosity of thermoplastic resin constituting matrix | Pa·s | 259 | 300 | 90 | 90 | 90 | 90 |
| Volume ratio of domain | % by volume | 60 | 50 | 60 | 60 | 60 | 60 |
| Proportion of SIBS in domain | % by weight | 65 | 70 | 60 | 60 | 60 | 60 |
| Oxygen permeability coefficient of thermoplastic resin composition | cm$^3$·mm/(m$^2$·day·mmHg) | 0.0004 | 0.0086 | 0.0113 | 0.0150 | 0.0134 | 0.0095 |
| 10% Modulus of thermoplastic resin composition | MPa | 10.0 | 9.9 | 5.4 | 5.3 | 5.4 | 6.1 |
| Extrusion processability of thermoplastic resin composition |  | Good | Good | Good | Good | Good | Good |
| Dynamic fatigue durability of thermoplastic resin composition |  | 80 | 80 | 90 | 90 | 90 | 80 |

TABLE 3

|  |  | Example 13 | Example 14 | Comparative Example 1 | Comparative Example 2 | Comparative Example 3 |
|---|---|---|---|---|---|---|
| Nylon-1 | part(s) by weight | 62.1 | 52.6 | 77.4 | 79.3 |  |
| Nylon-2 | part(s) by weight |  |  |  |  |  |
| Nylon-3 | part(s) by weight |  |  |  |  |  |
| Nylon-4 | part(s) by weight |  |  |  |  | 62.2 |
| EVOH | part(s) by weight |  |  |  |  |  |
| Polyester | part(s) by weight |  |  |  |  |  |
| SIBS | part(s) by weight | 80.0 | 80.0 | 100.0 |  | 80.0 |
| Acid-modified styrene-based elastomer-1 | part(s) by weight | 20.0 | 20.0 |  | 100.0 | 20.0 |
| Acid-modified styrene-based elastomer-2 | part(s) by weight |  |  |  |  |  |
| Acid-modified polyolefin-1 | part(s) by weight |  |  |  |  |  |
| Acid-modified polyolefin-2 | part(s) by weight |  |  |  |  |  |

TABLE 3-continued

|  |  | Example 13 | Example 14 | Comparative Example 1 | Comparative Example 2 | Comparative Example 3 |
|---|---|---|---|---|---|---|
| Zinc oxide | part(s) by weight | 5.0 | 5.0 | 5.0 | 5.0 | 5.0 |
| Stearic acid | part(s) by weight | 1.0 | 1.0 | 1.0 | 1.0 | 1.0 |
| Calcium stearate | part(s) by weight | 1.0 | 1.0 | 1.0 | 1.0 | 1.0 |
| Trihydric alcohol having triazine backbone | part(s) by weight | 0.1 | 8.0 |  |  |  |
| Total | part(s) by weight | 169.2 | 167.6 | 184.4 | 186.3 | 169.2 |
| Melt viscosity of thermoplastic resin constituting matrix | Pa·s | 90 | 90 | 90 | 90 | 600 |
| Volume ratio of domain | % by volume | 65 | 65 | 60 | 60 | 65 |
| Proportion of SIBS in domain | % by weight | 80 | 80 | 100 | 0 | 80 |
| Oxygen permeability coefficient of thermoplastic resin composition | $cm^3 \cdot mm/(m^2 \cdot day \cdot mmHg)$ | 0.0078 | 0.0075 | — | 0.0342 | — |
| 10% modulus of thermoplastic resin composition | MPa | 5.1 | 5.7 | — | 5.5 | — |
| Extrusion processability of thermoplastic resin composition |  | Good | Acceptable | Not acceptable | Good | Not acceptable |
| Dynamic fatigue durability of thermoplastic resin composition |  | 110 | 200 | — | 90 | — |

INDUSTRIAL APPLICABILITY

The thermoplastic resin composition of the present invention can be suitably utilized for producing a cooling medium transportation pipe.

The invention claimed is:

1. A thermoplastic resin composition for a cooling medium transportation pipe, comprising a matrix comprising a thermoplastic resin and a domain comprising a rubber dispersed in the matrix, wherein the thermoplastic resin composition has an oxygen permeability coefficient of not more than 0.02 $cm^3 \cdot mm/(m^2 \cdot day \cdot mmHg)$ at a temperature of 21° C. and at a relative humidity of 0%, the thermoplastic resin constituting the matrix has a melt viscosity of not more than 300 Pa·s at a temperature of 250° C. and at a shear rate of 243.2 $s^{-1}$, wherein the thermoplastic resin comprises (i) a combination of a thermoplastic resin having a melting point or glass transition point of not less than 150° C. and also a thermoplastic resin having an oxygen permeability coefficient of not more than 0.004 $cm^3 \cdot mm/(m^2 \cdot day \cdot mmHg)$ at a temperature of 21° C. and at a relative humidity of 0%, or wherein the thermoplastic resin comprises (ii) a thermoplastic resin having a melting point or glass transition point of not less than 150° C. and having an oxygen permeability coefficient of not more than 0.004 $cm^3 \cdot mm/(m^2 \cdot day \cdot mmHg)$ at a temperature of 21° C. and at a relative humidity of 0%, and the rubber comprises an isobutylene-based block copolymer comprising a styrene-isobutylene-styrene triblock copolymer, and also an olefin-based or styrene-based polymer having at least one functional group selected from the group consisting of an epoxy group, an amino group, a hydroxyl group, an acid anhydride group and a carboxyl group.

2. The thermoplastic resin composition for a cooling medium transportation pipe according to claim 1, wherein the thermoplastic resin composition has a stress at 10% strain (10% modulus) of not more than 10 MPa at a temperature of 25° C. and at a relative humidity of 50% in a tensile test according to JIS K7161.

3. The thermoplastic resin composition for a cooling medium transportation pipe according to claim 2, wherein the thermoplastic resin is at least one selected from the group consisting of a polyamide, a polyester, an ethylene-vinyl alcohol copolymer, a polycarbonate and a polyketone.

4. The thermoplastic resin composition for a cooling medium transportation pipe according to claim 2, wherein the olefin-based or styrene-based polymer having at least one functional group selected from the group consisting of an epoxy group, an amino group, a hydroxyl group, an acid anhydride group and a carboxyl group is at least one selected from the group consisting of an acid anhydride-modified α-olefin-based thermoplastic elastomer, an acid anhydride-modified styrene-ethylene-butylene-styrene block copolymer, an acid anhydride-modified styrene-ethylene-propylene-styrene block copolymer and an acid anhydride-modified ethylene-ethyl acrylate copolymer.

5. The thermoplastic resin composition for a cooling medium transportation pipe according to claim 2, wherein the thermoplastic resin composition comprises the matrix at a volume ratio of 25 to 50% by volume and the domain at a volume ratio of 50 to 75% by volume.

6. The thermoplastic resin composition for a cooling medium transportation pipe according to claim 2, wherein the proportion of the total amount of the (i) combination of the thermoplastic resin having a melting point or glass transition point of not less than 150° C., and also the thermoplastic resin having an oxygen permeability coefficient of not more than 0.004 $cm^3 \cdot mm/(m^2 \cdot day \cdot mmHg)$ at a temperature of 21° C. and at a relative humidity of 0%, or (ii) the thermoplastic resin having a melting point or glass transition point of 150° C. or more and having an oxygen permeability coefficient of not more than 0.004 $cm^3 \cdot mm/(m^2 \cdot day \cdot mmHg)$ at a temperature of 21° C. and at a relative humidity of 0% in the matrix, is not less than 50% by weight.

7. The thermoplastic resin composition for a cooling medium transportation pipe according to claim 1, wherein the thermoplastic resin is at least one selected from the group consisting of a polyamide, a polyester, an ethylene-vinyl alcohol copolymer, a polycarbonate and a polyketone.

8. The thermoplastic resin composition for a cooling medium transportation pipe according to claim 7, wherein the olefin-based or styrene-based polymer having at least one functional group selected from the group consisting of an epoxy group, an amino group, a hydroxyl group, an acid anhydride group and a carboxyl group is at least one selected from the group consisting of an acid anhydride-modified α-olefin-based thermoplastic elastomer, an acid anhydride-modified styrene-ethylene-butylene-styrene block copolymer, an acid anhydride-modified styrene-ethylene-propylene-styrene block copolymer and an acid anhydride-modified ethylene-ethyl acrylate copolymer.

9. The thermoplastic resin composition for a cooling medium transportation pipe according to claim 7, wherein the thermoplastic resin composition comprises the matrix at a volume ratio of 25 to 50% by volume and the domain at a volume ratio of 50 to 75% by volume.

10. The thermoplastic resin composition for a cooling medium transportation pipe according to claim 7, wherein the proportion of the total amount of the (i) combination of the thermoplastic resin having a melting point or glass transition point of not less than 150° C., and also the thermoplastic resin having an oxygen permeability coefficient of not more than 0.004 cm$^3$·mm/(m$^2$·day·mmHg) at a temperature of 21° C. and at a relative humidity of 0%, or (ii) the thermoplastic resin having a melting point or glass transition point of 150° C. or more and having an oxygen permeability coefficient of not more than 0.004 cm$^3$·mm/(m$^2$·day·mmHg) at a temperature of 21° C. and at a relative humidity of 0% in the matrix, is not less than 50% by weight.

11. The thermoplastic resin composition for a cooling medium transportation pipe according to claim 1, wherein the olefin-based or styrene-based polymer having at least one functional group selected from the group consisting of an epoxy group, an amino group, a hydroxyl group, an acid anhydride group and a carboxyl group is at least one selected from the group consisting of an acid anhydride-modified α-olefin-based thermoplastic elastomer, an acid anhydride-modified styrene-ethylene-butylene-styrene block copolymer, an acid anhydride-modified styrene-ethylene-propylene-styrene block copolymer and an acid anhydride-modified ethylene-ethyl acrylate copolymer.

12. The thermoplastic resin composition for a cooling medium transportation pipe according to claim 11, wherein the thermoplastic resin composition comprises the matrix at a volume ratio of 25 to 50% by volume and the domain at a volume ratio of 50 to 75% by volume.

13. The thermoplastic resin composition for a cooling medium transportation pipe according to claim 11, wherein the proportion of the total amount of the (i) combination of the thermoplastic resin having a melting point or glass transition point of not less than 150° C., and also the thermoplastic resin having an oxygen permeability coefficient of not more than 0.004 cm$^3$·mm/(m$^2$·day·mmHg) at a temperature of 21° C. and at a relative humidity of 0%, or (ii) the thermoplastic resin having a melting point or glass transition point of 150° C. or more and having an oxygen permeability coefficient of not more than 0.004 cm$^3$·mm/(m$^2$·day·mmHg) at a temperature of 21° C. and at a relative humidity of 0% in the matrix, is not less than 50% by weight.

14. The thermoplastic resin composition for a cooling medium transportation pipe according to claim 1, wherein the thermoplastic resin composition comprises the matrix at a volume ratio of 25 to 50% by volume and the domain at a volume ratio of 50 to 75% by volume.

15. The thermoplastic resin composition for a cooling medium transportation pipe according to claim 1, wherein the proportion of the total amount of the (i) combination of the thermoplastic resin having a melting point or glass transition point of not less than 150° C., and also the thermoplastic resin having an oxygen permeability coefficient of not more than 0.004 cm$^3$·mm/(m$^2$·day·mmHg) at a temperature of 21° C. and at a relative humidity of 0%, or (ii) the thermoplastic resin having a melting point or glass transition point of 150° C. or more and having an oxygen permeability coefficient of not more than 0.004 cm$^3$·mm/(m$^2$·day·mmHg) at a temperature of 21° C. and at a relative humidity of 0%, in the matrix is not less than 50% by weight.

16. The thermoplastic resin composition for a cooling medium transportation pipe according to claim 1, wherein the proportion of the isobutylene-based block copolymer in the domain is 50 to 95% by weight.

17. The thermoplastic resin composition for a cooling medium transportation pipe according to claim 1, wherein the thermoplastic resin composition comprises 0.5 to 5 parts by weight of at least one selected from the group consisting of a fatty acid, a fatty acid metal salt, a fatty acid ester and a fatty acid amide based on 100 parts by weight of the rubber in the thermoplastic resin composition.

18. The thermoplastic resin composition for a cooling medium transportation pipe according to claim 1, wherein the thermoplastic resin composition comprises 0.5 to 10 parts by weight of a divalent metal oxide based on 100 parts by weight of the rubber in the thermoplastic resin composition.

19. The thermoplastic resin composition for a cooling medium transportation pipe according to claim 1, wherein the thermoplastic resin composition comprises 0.1 to 8 parts by weight of a trihydric alcohol having a triazine backbone based on 100 parts by weight of the rubber in the thermoplastic resin composition.

20. A cooling medium transportation pipe comprising a layer of the thermoplastic resin composition according to claim 1, as an inner layer.

\* \* \* \* \*